United States Patent
Nagai (10) Patent No.: US 7,474,543 B2
(45) Date of Patent: Jan. 6, 2009

(54) ISOLATED DC-DC CONVERTER

(75) Inventor: Jun Nagai, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 523 days.

(21) Appl. No.: 10/568,480

(22) PCT Filed: Sep. 30, 2005

(86) PCT No.: PCT/JP2005/018150

§ 371 (c)(1),
(2), (4) Date: Feb. 15, 2006

(87) PCT Pub. No.: WO2006/080112

PCT Pub. Date: Aug. 3, 2006

(65) Prior Publication Data

US 2008/0205090 A1    Aug. 28, 2008

(30) Foreign Application Priority Data

Jan. 31, 2005 (JP) ............................. 2005-023500
Jul. 7, 2005 (JP) ............................. 2005-199106

(51) Int. Cl.
*H02M 3/335* (2006.01)
(52) U.S. Cl. .................. 363/21.06; 363/21.08
(58) Field of Classification Search ............ 363/16, 363/20, 21.01, 21.06, 21.08, 95, 97, 127
See application file for complete search history.

(56) References Cited

U.S. PATENT DOCUMENTS 6,459,594 B1 * 10/2002 Tsuji et al. ............... 363/21.08

2007/0153554 A1 * 7/2007 Matsumoto ............... 363/16

FOREIGN PATENT DOCUMENTS

| JP | 2000-50627 A | 2/2000 |
| JP | 3339452 B2 | 8/2002 |
| JP | 3391320 B2 | 1/2003 |
| JP | 2004-208444 A | 7/2004 |

OTHER PUBLICATIONS

International Search Report for PCT Application No. PCT/JP2005/018150 mailed Nov. 11, 2005.
Official communication issued in counterpart Chinese Application No. 200580000815.9, issued on Feb. 15, 2008.

* cited by examiner

*Primary Examiner*—Adolf Berhane
(74) *Attorney, Agent, or Firm*—Keating & Bennett, LLP (57) ABSTRACT

A secondary-side rectifying and smoothing circuit rectifies and smoothes an output voltage from a secondary coil of a transformer and outputs a rectified and smoothed voltage to the outside. A tertiary-side rectifying and smoothing circuit rectifies and smoothes an output voltage from a tertiary coil to produce a direct-current voltage and detects and outputs the direct-current voltage as a detected voltage of the output voltage from the secondary-side rectifying and smoothing circuit. A control circuit controls the switching operation of a main switching device on the basis of the detected voltage so that the output voltage is stabilized. The secondary-side rectifying and smoothing circuit includes a rectification-side synchronous rectifier and a commutation-side synchronous rectifier as rectifying devices. The tertiary-side rectifying and smoothing circuit includes a commutation-side synchronous rectifier as a rectifying device that rectifies the output voltage from the tertiary coil, the commutation-side synchronous rectifier being switched on when the main switching device is turned off.

7 Claims, 7 Drawing Sheets

ISOLATED DC-DC CONVERTER

BACKGROUND OF THE INVENTION

1. Field of the Invention

The present invention relates to an isolated DC-DC converter that has a configuration for indirectly detecting an output voltage supplied to the exterior and performing stabilizing control of the output voltage on the basis of the detected voltage.

2. Description of the Related Art

Figure 6:
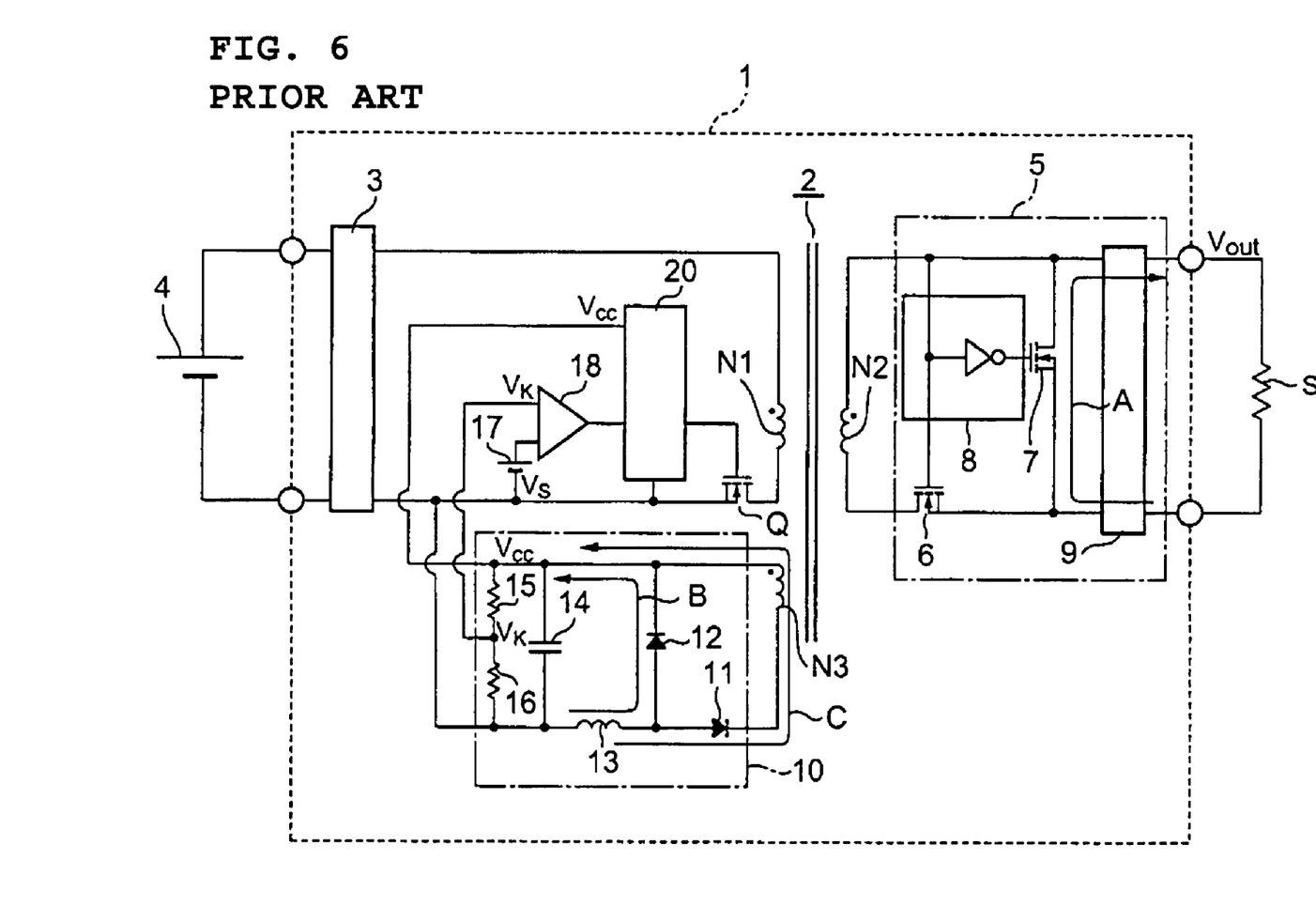
FIG. 6 is a circuit diagram showing main circuit components of a known isolated DC-DC converter.

FIG. 6 shows main circuit components of a typical isolated DC-DC converter. The isolated DC-DC converter 1 includes a transformer 2. A main switching device (for example, a MOS-FET) Q and an input filter circuit 3 are provided on the side of a primary coil N1 of the transformer 2. Energy is supplied to the primary coil N1 from an external power supply 4 via the input filter circuit 3 by the switching operation of the main switching device Q.

A secondary-side rectifying and smoothing circuit 5 is provided on the side of a secondary coil N2 of the transformer 2. The secondary-side rectifying and smoothing circuit 5 includes a rectification-side synchronous rectifier (for example, a MOS-FET) 6, a commutation-side synchronous rectifier (for example, a MOS-FET) 7, a synchronous-rectifier driving circuit 8, and a smoothing circuit 9. The voltage output from the secondary coil N2 corresponds to the voltage generated in the primary coil N1. The secondary-side rectifying and smoothing circuit 5 rectifies and smoothes the output voltage from the secondary coil N2 to produce a direct-current voltage and outputs the direct-current voltage to an external load S as an output voltage Vout.

A tertiary-side rectifying and smoothing circuit 10 is provided on the side of a tertiary coil N3 of the transformer 2. The tertiary-side rectifying and smoothing circuit 10 includes a rectification-side diode 11, a commutation-side diode 12, a choke coil 13, a smoothing capacitor 14, and voltage-dividing resistors 15 and 16. The tertiary-side rectifying and smoothing circuit 10 rectifies and smoothes the output voltage from the tertiary coil N3 to produce a direct-current voltage and detects and outputs the direct-current voltage as a detected voltage Vk of the output voltage Vout from the secondary-side rectifying and smoothing circuit 5.

The isolated DC-DC converter 1 further includes an error amplifier 18. The error amplifier 18 outputs a voltage corresponding to the difference between the detected voltage Vk output from the tertiary-side rectifying and smoothing circuit 10 and a reference voltage Vs from a reference supply 17. The isolated DC-DC converter 1 further includes a control circuit 20. The control circuit 20 has circuitry for controlling the switching operation of the main switching device Q by, for example, the PWM control method on the basis of the output voltage from the error amplifier 18 (i.e., on the basis of the detected voltage Vk from the tertiary-side rectifying and smoothing circuit 10) so that the output voltage Vout from the secondary-side rectifying and smoothing circuit 5 is stabilized at a predetermined voltage. In this example, the control circuit 20 uses a direct-current voltage Vcc output from the smoothing capacitor 14 of the tertiary-side rectifying and smoothing circuit 10 as a supply voltage.

Patent Document 1: Japanese Patent No. 3391320.
Patent Document 2: Japanese Patent No. 3339452.

In the aforementioned isolated DC-DC converter 1, it is desirable that the output voltage Vout be completely proportional to the detected voltage Vk output from the tertiary-side rectifying and smoothing circuit 10 to achieve satisfactory accuracy of the output voltage. However, in the configuration of the isolated DC-DC converter 1 shown in FIG. 6, there is a problem such that the proportional relationship between the output voltage Vout and the detected voltage Vk is broken due to the circuit operation that is described below in the period in which the main switching device Q is switched off.

Figure 7:
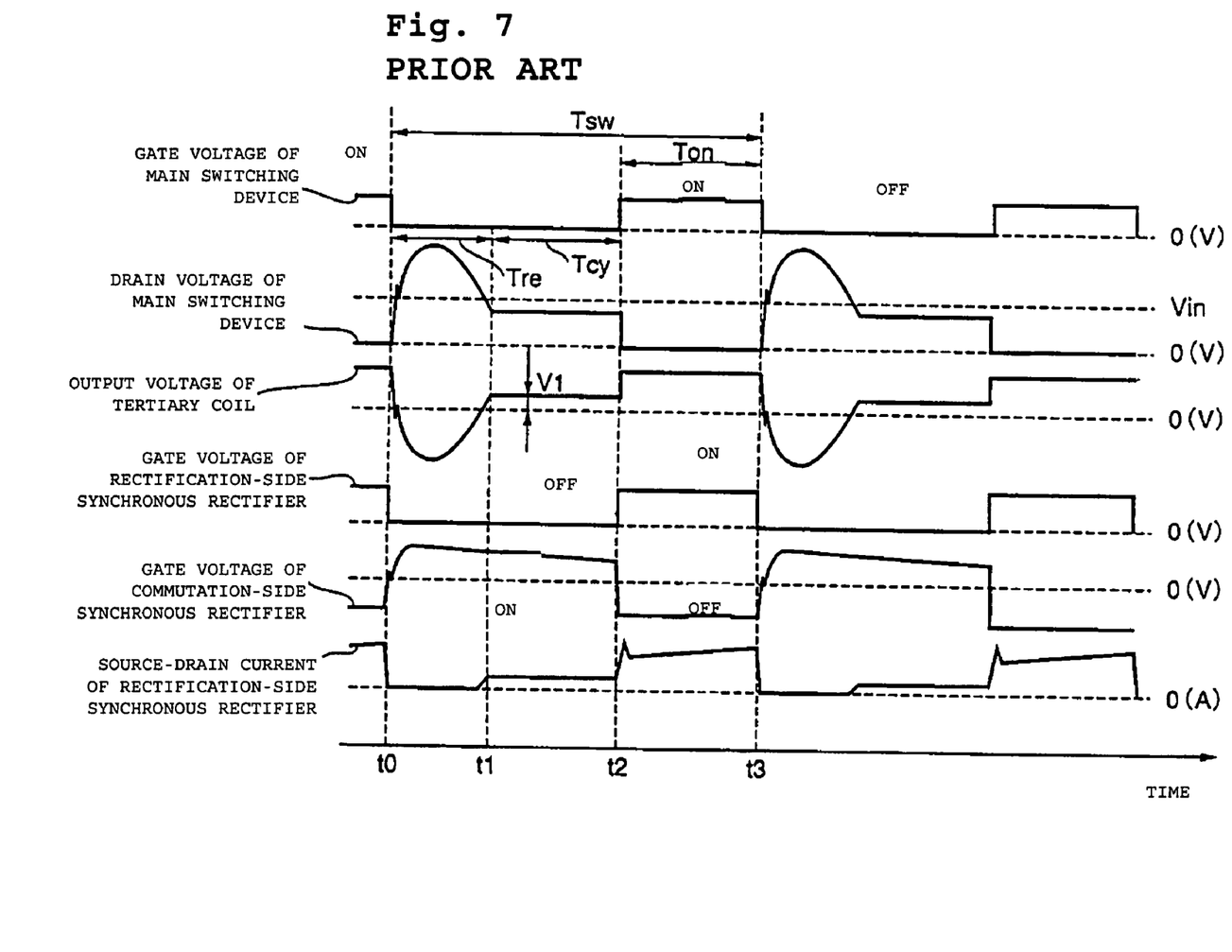
FIG. 7 is a wave form chart illustrating an example of the circuit operation of the main circuit components of the isolated DC-DC converter shown in FIG. 6.

An example of the circuit operation in the period in which the main switching device Q is switched off will now be described using the wave form chart of FIG. 7. For example, when the main switching device Q is switched off (time t0), LC resonance due to parasitic capacitance generated in parallel between the source and drain of the main switching device Q and excitation inductance of the transformer 2 begins. This generates a pulse voltage of the LC resonance as shown in FIG. 7 at the drain of the main switching device Q. When a half cycle of the LC resonance has elapsed (time t1), resetting of the transformer 2 is completed.

The drain voltage of the main switching device Q is in a state in which the drain voltage is clamped at a voltage Vd described below during the period between the time when resetting of the transformer 2 is completed and the time when the main switching device Q is turned on (the period between time t1 and time t2). Moreover, a driving voltage is applied to the gate of the commutation-side synchronous rectifier 7 by the synchronous-rectifier driving circuit 8 so that the commutation-side synchronous rectifier 7 is controlled so as to be in an on-state during the period in which the main switching device Q is switched off. Moreover, no driving voltage is applied to the gate of the rectification-side synchronous rectifier 6 so that the rectification-side synchronous rectifier 6 is controlled so as to be in an off-state during the period in which the main switching device Q is switched off.

Energy due to excitation inductance of a choke coil (not shown) that defines a smoothing circuit 9 is applied along a path A as shown in FIG. 6 so that power is supplied to the load S during the period in which the main switching device Q is switched off. The rectification-side synchronous rectifier 6 is controlled so as to be in an off-state as described above during the period in which the main switching device Q is switched off. However, due to a parasitic diode generated in parallel between the drain and source of the rectification-side synchronous rectifier 6, an excitation current of the transformer 2 circulates around a path through the secondary coil N2 of the transformer 2, the commutation-side synchronous rectifier 7, the parasitic diode of the rectification-side synchronous rectifier 6, and the secondary coil N2 when resetting of the transformer 2 is completed. This generates a forward dropdown voltage Vf of the parasitic diode across both ends of the rectification-side synchronous rectifier 6. Thus, the voltage at both ends of the secondary coil N2 is clamped at the forward drop-down voltage Vf of the parasitic diode of the rectification-side synchronous rectifier 6 during the period between the time when resetting of the transformer 2 is completed and the time when the main switching device Q is turned on (the period between t1 and t2 (transformer-excitation-current circulation period)).

Accordingly, in a case where Vin is an input voltage supplied from the external power supply 4 to the isolated DC-DC converter 1, N1 is the number of turns of the primary coil N1, N2 is the number of turns of the secondary coil N2, and N3 is the number of turns of the tertiary coil N3, a clamp voltage Vd of the drain of the main switching device Q during the transformer-excitation-current circulation period (the period between t1 and t2) is calculated by an expression Vd Vin−(N1/N2)×Vf. A voltage V3 generated in the tertiary coil N3 is clamped at a voltage calculated by an expression V3=(N3/N2)×Vf.

In the tertiary-side rectifying and smoothing circuit 10, current is applied along a path B that passes through the choke coil 13 and the commutation-side diode 12 as shown in FIG. 6 due to energy stored in the choke coil 13 during the period in which the main switching device Q is switched off. The voltage V3 is generated in the tertiary coil N3 as described above during the period in which the main switching device Q is switched off. In the tertiary-side rectifying and smoothing circuit 10, the diode 12 having one-way conductivity is provided as a rectifying device on the commutation side. Thus, current due to the voltage V3 of the tertiary coil N3 does not follow a path that sequentially passes through the commutation-side diode 12 and the rectification-side diode 11 but follows a path C that passes through the choke coil 13, the rectification-side diode 11, and the tertiary coil N3, as shown in FIG. 6. In the tertiary-side rectifying and smoothing circuit 10, the detected voltage Vk during the period in which the main switching device Q is switched off is obtained by superimposing a voltage caused by applying current along the path B on a voltage caused by applying current along the path C.

During the aforementioned period in which the main switching device Q is switched off, the voltage Vout output from the secondary-side rectifying and smoothing circuit 5 to the load S is not affected by the voltage Vf generated in the secondary coil N2. In contrast, the detected voltage Vk output from the tertiary-side rectifying and smoothing circuit 10 is affected by the voltage V3 of the tertiary coil N3 due to the voltage Vf of the secondary coil N2. Thus, the correlation between the output voltage Vout from the secondary-side rectifying and smoothing circuit 5 and the detected voltage Vk from the tertiary-side rectifying and smoothing circuit 10 is broken.

That is to say, the correlation between the detected voltage Vk from the tertiary-side rectifying and smoothing circuit 10 and the output voltage Vout from the secondary-side rectifying and smoothing circuit 5 is weakened by a voltage V2 given by the following expression:

$$V2 = Vf \times (N3/N2) \times (Tcy/Tsw).$$

Here, Vf is a forward drop-down voltage of the parasitic diode of the rectification-side synchronous rectifier 6 during the period in which the main switching device Q is switched off, N2 is the number of turns of the secondary coil N2, N3 is the number of turns of the tertiary coil N3, Tcy is the length of the transformer-excitation-current circulation period, and Tsw is the length of one switching cycle.

In the isolated DC-DC converter 1 having the circuitry shown in FIG. 6, the length of the transformer-excitation-current circulation period depends on the magnitude of the input voltage Vin. Thus, a change in the input voltage Vin changes the relationship between the output voltage Vout from the secondary-side rectifying and smoothing circuit 5 and the detected voltage Vk from the tertiary-side rectifying and smoothing circuit 10. The forward drop-down voltage Vf of the diode increases as the environmental temperature becomes low and decreases as the environmental temperature becomes high. Accordingly, the relationship between the output voltage Vout from the secondary-side rectifying and smoothing circuit 5 and the detected voltage Vk from the tertiary-side rectifying and smoothing circuit 10 is changed by a change in the environmental temperature.

In this way, the relationship between the output voltage Vout and the detected voltage Vk is changed by a change in the input voltage Vin and a change in the environmental temperature. Thus, it is quite difficult to correct the detected voltage Vk so that the detected voltage Vk is proportional to the output voltage Vout. That is to say, in the circuitry of the isolated DC-DC converter 1 shown in FIG. 6, it is quite difficult to achieve a completely proportional relationship between the output voltage Vout and the detected voltage Vk, and there is a problem such that satisfactory accuracy of the output voltage Vout cannot be achieved. In particular, the ratio of the number of turns of the tertiary coil N3 to the number of turns of the secondary coil N2 (N3/N2) has tended to increase recently. Accordingly, the correlation between the output voltage Vout and the detected voltage Vk has been weakened, and it is increasingly difficult to hold the range of variation in the output voltage Vout within a predetermined tolerance in an isolated DC-DC converter 1 that has a low output voltage Vout and is low-powered.

SUMMARY OF THE INVENTION

In order to overcome the problems described above, preferred embodiments of the present invention provide an isolated DC-DC converter which includes a transformer that includes a primary coil, a secondary coil, and a tertiary coil that are electromagnetically coupled, a main switching device that is provided on the side of the primary coil of the transformer and controls energy supplied from an external power supply to the primary coil by a switching operation to control a voltage generated in the primary coil, a secondary-side rectifying and smoothing circuit that rectifies and smoothes an output voltage from the secondary coil corresponding to the voltage of the primary coil of the transformer and outputs a rectified and smoothed voltage to the outside, a tertiary-side rectifying and smoothing circuit that rectifies and smoothes an output voltage from the tertiary coil to produce a direct-current voltage and detects and outputs the direct-current voltage as a detected voltage of the output voltage from the secondary-side rectifying and smoothing circuit, and a control circuit that controls the switching operation of the main switching device on the basis of the detected voltage output from the tertiary-side rectifying and smoothing circuit so that the output voltage from the secondary-side rectifying and smoothing circuit is stabilized. The secondary-side rectifying and smoothing circuit includes a rectification-side synchronous rectifier and a commutation-side synchronous rectifier that perform a switching operation in synchronization with the switching operation of the main switching device as rectifying devices that rectify the output voltage from the secondary coil, and the tertiary-side rectifying and smoothing circuit includes a commutation-side synchronous rectifier as a rectifying device that rectifies the output voltage from the tertiary coil, the commutation-side synchronous rectifier being switched on when the main switching device is turned off.

According to the present preferred embodiment, the tertiary-side rectifying and smoothing circuit includes a commutation-side synchronous rectifier (for example, a FET) that is switched on when the main switching device is turned off as a rectifying device that rectifies the output voltage from the tertiary coil. In the isolated DC-DC converter according to the present preferred embodiment, there is a period (a transformer-excitation-current circulation period) in which an excitation current for keeping energy excited by the transformer circulates around a path through the commutation-side synchronous rectifier and rectification-side synchronous rectifier of the secondary-side rectifying and smoothing circuit and the secondary coil during the period in which the main switching device is switched off. The commutation-side synchronous rectifier is provided as a rectifying device of the tertiary-side rectifying and smoothing circuit. Thus, during the transformer-excitation-current circulation period, a current caused by an induced voltage of the tertiary coil due to the application of the excitation current to the secondary coil circulates through the commutation-side synchronous rectifier of the tertiary-side rectifying and smoothing circuit and the tertiary coil and does not pass through to the output side of the tertiary-side rectifying and smoothing circuit. That is to say, the voltage of the tertiary coil is not involved in the detected voltage output from the tertiary-side rectifying and smoothing circuit to the control circuit during the transformer-excitation-current circulation period in which the main switching device is switched off.

That is to say, in the known configuration, the detected voltage from the tertiary-side rectifying and smoothing circuit includes a voltage component that breaks the correlation between the output voltage from the secondary-side rectifying and smoothing circuit and the detected voltage from the tertiary-side rectifying and smoothing circuit (i.e., a voltage component due to the induced voltage of the tertiary coil). In contrast, in the present preferred embodiment, the voltage component, which breaks the correlation, can be prevented from being included in the detected voltage from the tertiary-side rectifying and smoothing circuit. Thus, a satisfactory correlation between the output voltage from the secondary-side rectifying and smoothing circuit and the detected voltage from the tertiary-side rectifying and smoothing circuit can be achieved.

Thus, the output voltage from the secondary-side rectifying and smoothing circuit can be accurately controlled by the switching control of the main switching device of the control circuit based on the detected voltage from the tertiary-side rectifying and smoothing circuit. Accordingly, accuracy of the output voltage from the isolated DC-DC converter can be improved.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

Preferred embodiments according to the present invention will now be described on the basis of the drawings.

Figure 1:
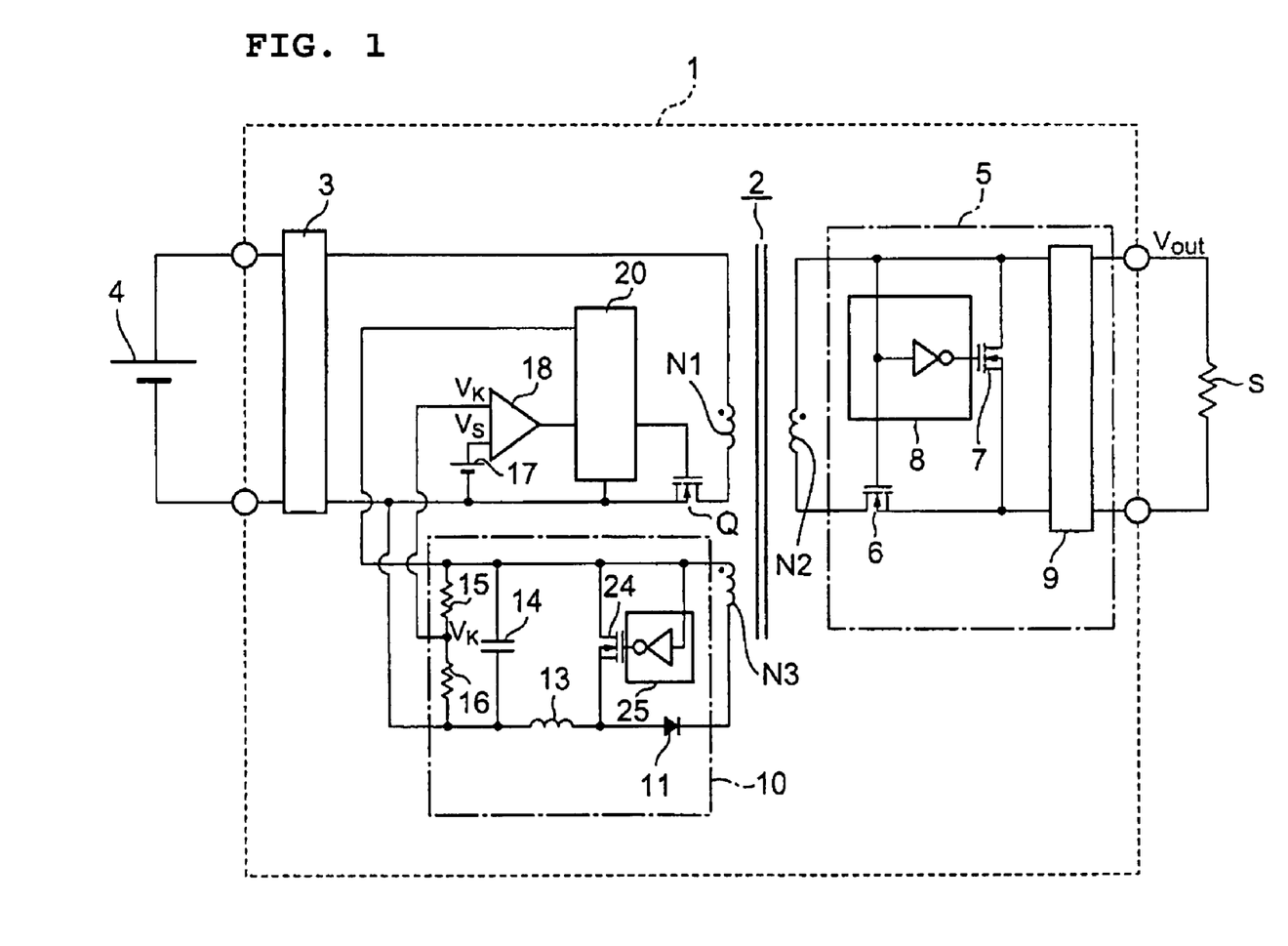
FIG. 1 is a circuit diagram showing main circuit components of an isolated DC-DC converter according to a first preferred embodiment of the present invention.

FIG. 1 shows main circuit components of an isolated DC-DC converter according to a first preferred embodiment. In the description of the first preferred embodiment, the same reference letters and numerals are assigned to the same components as in the isolated DC-DC converter shown in FIG. 6, and a duplicate description of the common components is omitted.

In the first preferred embodiment, a synchronous rectifier (for example, a MOS-FET) 24 is provided in the tertiary-side rectifying and smoothing circuit 10 as a rectifying device on the commutation side. A driving circuit 25 that turns on and off the synchronous rectifier 24 is also provided. The driving circuit 25 has a configuration for switching off the commutation-side synchronous rectifier 24 when the main switching device Q is switched on and switching on the commutation-side synchronous rectifier 24 when the main switching device Q is switched off, using a voltage generated in the tertiary coil N3.

In the first preferred embodiment, components other than the aforementioned components are the same as those shown in FIG. 6. In the first preferred embodiment, the commutation-side synchronous rectifier 24 is provided as the rectifying device on the commutation side of the tertiary-side rectifying and smoothing circuit 10. Thus, when the main switching device Q is switched off and when the transformer excitation current is applied to the secondary coil N2 (the transformer-excitation-current circulation period), the current due to the voltage V3 of the tertiary coil N3 corresponding to the voltage Vf of the secondary coil N2 circulates through the commutation-side synchronous rectifier 24, the rectification-side diode 11, and the tertiary coil N3.

Figure 2:
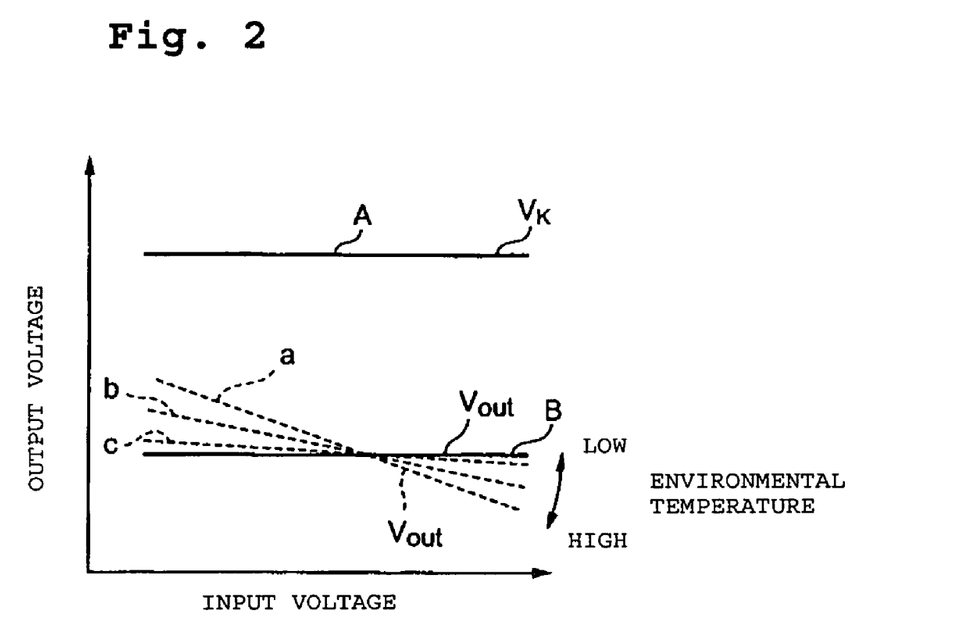
FIG. 2 is a graph illustrating an effect achieved by the configuration shown in FIG. 1.

In the known configuration, the current due to the voltage V3 of the tertiary coil N3 passes through to the choke coil 13 side. Thus, an unnecessary voltage corresponding to the voltage V3 of the tertiary coil N3 is superimposed on the voltage due to the excitation energy of the choke coil 13. Accordingly, the correlation between the output voltage Vout from the secondary-side rectifying and smoothing circuit 5 and the detected voltage Vk from the tertiary-side rectifying and smoothing circuit 10 is broken. The control circuit 20 has circuitry for performing control operation so that the detected voltage Vk is stabilized, assuming that the detected voltage Vk from the tertiary-side rectifying and smoothing circuit 10 is the output voltage Vout from the secondary-side rectifying and smoothing circuit 5. Thus, the detected voltage Vk from the tertiary-side rectifying and smoothing circuit 10 is substantially stabilized by the control operation of the control circuit 20 as shown by solid line A in the graph of FIG. 2 even when the input voltage or the environmental temperature changes. However, in the known configuration, the correlation between the detected voltage Vk from the tertiary-side rectifying and smoothing circuit 10 and the output voltage Vout from the secondary-side rectifying and smoothing circuit 5 is broken. Thus, although the control circuit 20 performs control operation so that the output voltage Vout is stabilized, the output voltage Vout from the secondary-side rectifying and smoothing circuit 5 is changed by a change in the input voltage and a change in the environmental temperature, as shown by dotted lines a to c in the graph of FIG. 2.

In contrast, in the configuration of the first preferred embodiment, the current due to the voltage V3 of the tertiary coil N3 can be prevented from flowing into the choke coil 13 side during the transformer-excitation-current circulation period. Thus, a voltage component that breaks the correlation between the output voltage Vout from the secondary-side rectifying and smoothing circuit 5 and the detected voltage Vk from the tertiary-side rectifying and smoothing circuit 10

(i.e., a voltage component due to the voltage V3 of the tertiary coil N3 corresponding to the voltage Vf of the secondary coil N2) can be prevented from being included in the detected voltage Vk from the tertiary-side rectifying and smoothing circuit 10. Thus, a satisfactory correlation between the output voltage Vout from the secondary-side rectifying and smoothing circuit 5 and the detected voltage Vk from the tertiary-side rectifying and smoothing circuit 10 can be achieved. Thus, regardless of a change in the input voltage and a change in the environmental temperature, the detected voltage Vk from the tertiary-side rectifying and smoothing circuit 10 and the output voltage Vout from the secondary-side rectifying and smoothing circuit 5 can be stabilized by the control operation of the control circuit 20 assuming that the detected voltage Vk from the tertiary-side rectifying and smoothing circuit 10 is the output voltage Vout from the secondary-side rectifying and smoothing circuit 5, as shown by solid lines A and B in the graph of FIG. 2. Accordingly, accuracy of the output from the isolated DC-DC converter 1 can be improved.

A second preferred embodiment will now be described. In the description of the second preferred embodiment, the same reference letters and numerals are assigned to the same components as in the first preferred embodiment, and a duplicate description of the common components is omitted.

Figure 3:
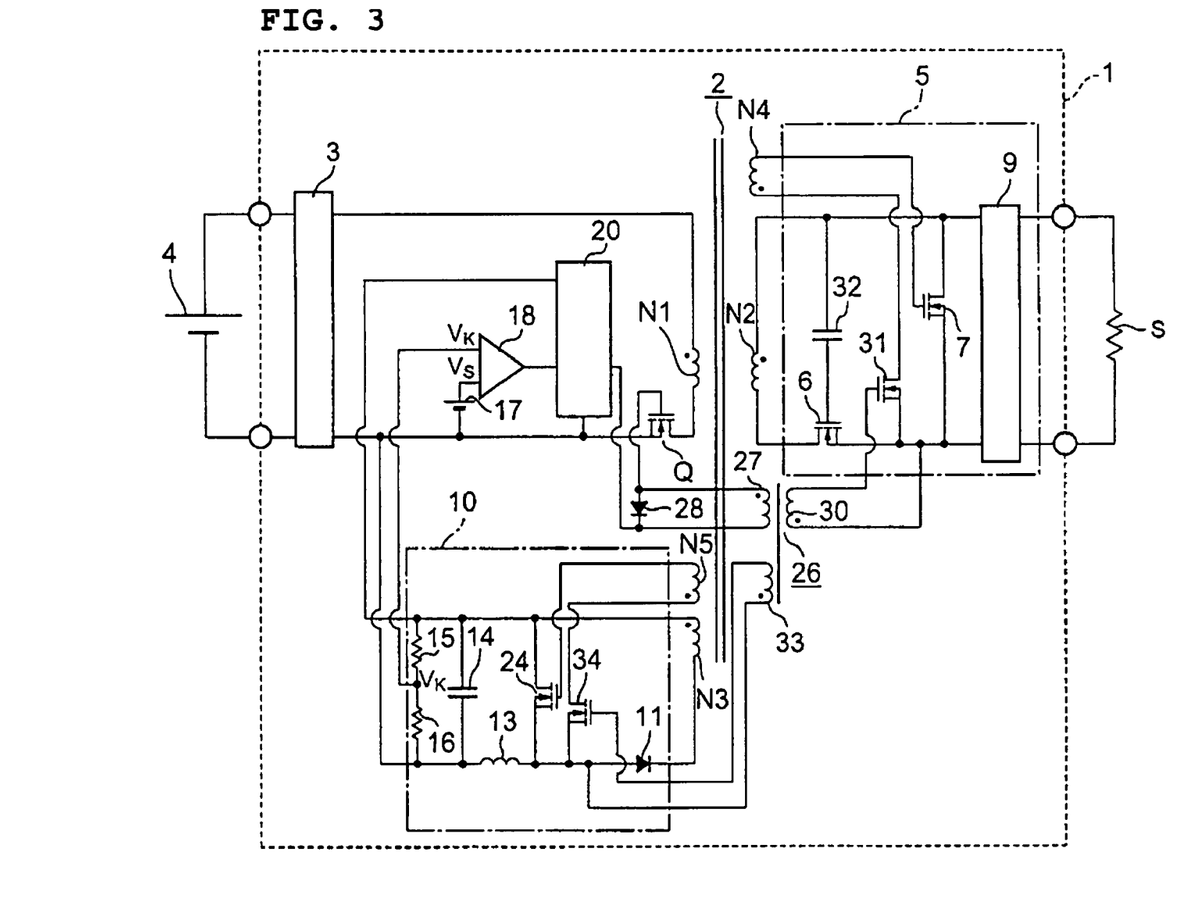
FIG. 3 is a circuit diagram showing main circuit components of an isolated DC-DC converter according to a second preferred embodiment of the present invention.

FIG. 3 shows main components of an isolated DC-DC converter according to the second preferred embodiment. In the second preferred embodiment, the synchronous rectifier 24 is provided as a rectifying device on the commutation side of the tertiary-side rectifying and smoothing circuit 10, as in the first preferred embodiment. A primary coil 27 of a driving transformer 26 is provided on a current path from the control circuit 20 to the gate of the main switching device Q. A diode 28 is provided in parallel with the primary coil 27.

The transformer 2 further includes a quartic coil N4. One end of the quartic coil N4 is connected to the gate of the commutation-side synchronous rectifier 7 of the secondary-side rectifying and smoothing circuit 5. A driving switch device (for example, a MOS-FET) 31 is provided on the side of the other end of the quartic coil N4. The drain, source, and control terminal (gate) of the driving switch device 31 are connected to the other end of the quartic coil N4, the source of the commutation-side synchronous rectifier 7, and one end of a secondary coil 30 of the driving transformer 26, respectively. The other end of the secondary coil 30 is connected to the source of the rectification-side synchronous rectifier 6. A capacitor 32 is provided between the gate of the synchronous rectifier 6 of the secondary-side rectifying and smoothing circuit 5 and the secondary coil N2.

The driving transformer 26 further includes a tertiary coil 33. The transformer 2 further includes a quintic coil N5. A driving switch device (for example, a MOS-FET) 34 is also provided. One end of the quintic coil N5 is connected to the gate of the commutation-side synchronous rectifier 24, and the other end of the quintic coil N5 is connected to the drain of the driving switch device 34. The source of the driving switch device 34 is connected to the source of the commutation-side synchronous rectifier 24. The control terminal (gate) of the driving switch device 34 is connected to one end of the tertiary coil 33. The other end of the tertiary coil 33 is connected to a connection portion between the source of the driving switch device 34 and the anode of the rectification-side diode 11.

Components other than the aforementioned components in the second preferred embodiment are the same as those in the first preferred embodiment. An example of the circuit operation of the aforementioned circuit components in the second preferred embodiment will now be described. In the second preferred embodiment, an input capacitance of the commutation-side synchronous rectifier 7 is charged by a voltage induced by the quartic coil N4 of the transformer 2 and is switched on during the period in which the main switching device Q is switched off. An input capacitance of the commutation-side synchronous rectifier 24 is also charged by a voltage induced by the quintic coil N5 of the transformer 2 and is switched on.

For example, when the control circuit 20 outputs a turn-on signal for switching on the main switching device Q to the gate of the main switching device Q, the turn-on signal is applied to the primary coil 27 of the driving transformer 26 and an input capacitance of the main switching device Q. The charge of the input capacitance of the main switching device Q is started by this operation. The main switching device Q is turned on when the input capacitance of the main switching device Q has been charged in response to the turn-on signal output from the control circuit 20. In the second preferred embodiment, the primary coil 27 of the driving transformer 26 is provided on a path for charging the input capacitance of the main switching device Q. Thus, the charge rate of the input capacitance of the main switching device Q is decreased, and the turn-on of the main switching device Q is delayed.

On the other hand, in the driving transformer 26, the following voltage is induced by the secondary coil 30 due to the applied turn-on signal when the application of the turn-on signal output from the control circuit 20 to the primary coil 27 has started. That is to say, the voltage induced by the secondary coil 30 can turn on the driving switch device 31 by instantaneously charging an input capacitance of the driving switch device 31 when the application of the turn-on signal to the primary coil 27 has been started. The driving switch device 31 is turned on by the voltage induced by the secondary coil 30 just after the control circuit 20 starts to output the turn-on signal.

The electric charge in the input capacitance of the commutation-side synchronous rectifier 7 is discharged through the quartic coil N4 and the driving switch device 31 by turning on the driving switch device 31. The commutation-side synchronous rectifier 7 is switched off by this operation.

In the second preferred embodiment, the number of turns of the primary coil 27 of the driving transformer 26 and the like are designed so that the charge of the input capacitance of the main switching device Q is not completed when the commutation-side synchronous rectifier 7 has been switched off. Thus, the commutation-side synchronous rectifier 7 of the secondary-side rectifying and smoothing circuit 5 is switched off during a period for charging the input capacitance between the time when the control circuit 20 starts to output the turn-on signal and the time when the input capacitance of the main switching device Q is charged to turn on the main switching device Q, i.e., before the main switching device Q is turned on.

The commutation-side synchronous rectifier 24 of the tertiary-side rectifying and smoothing circuit 10 is also turned off as in the aforementioned case before the main switching device Q is switched on. That is to say, when the control circuit 20 starts to output the turn-on signal to the main switching device Q and when the turn-on signal is applied to the primary coil 27 of the driving transformer 26, a voltage is induced in the tertiary coil 33 of the driving transformer 26 due to the applied turn-on signal. The charge of an input capacitance of the driving switch device 34 is instantaneously completed by this induced voltage, and the driving switch device 34 is switched on. Then, the electric charge in the input capacitance of the commutation-side synchronous rectifier 24 is discharged through the quintic coil N5 and the driving switch device 34. The commutation-side synchronous rectifier 24 is switched off by this operation before the main switching device Q is turned on.

That is to say, in the second preferred embodiment, the driving transformer 26, the driving switch device 31, and the path of the driving switch device 31 for discharging the electric charge in the input capacitance define an early-turn-off circuit of the commutation-side synchronous rectifier 7 of the secondary-side rectifying and smoothing circuit 5. Moreover, the driving transformer 26, the driving switch device 34, and the path of the driving switch device 34 for discharging the electric charge in the input capacitance define an early-turn-off circuit of the commutation-side synchronous rectifier 24 of the tertiary-side rectifying and smoothing circuit 10.

In the second preferred embodiment, the early-turn-off circuits are provided, which switch off the commutation-side synchronous rectifier 7 of the secondary-side rectifying and smoothing circuit 5 and the commutation-side synchronous rectifier 24 of the tertiary-side rectifying and smoothing circuit 10 before the main switching device Q is turned on. Thus, since the commutation-side synchronous rectifiers 7 and 24 have been already switched off when the main switching device Q is turned on, various types of problems due to the delayed turn-off of the commutation-side synchronous rectifiers 7 and 24, for example, a decrease in the circuit efficiency, can be prevented.

A third preferred embodiment will now be described. In the description of the third preferred embodiment, the same reference letters and numerals are assigned to the same components as in the first and second preferred embodiments, and a duplicate description of the common components is omitted.

Figure 4:
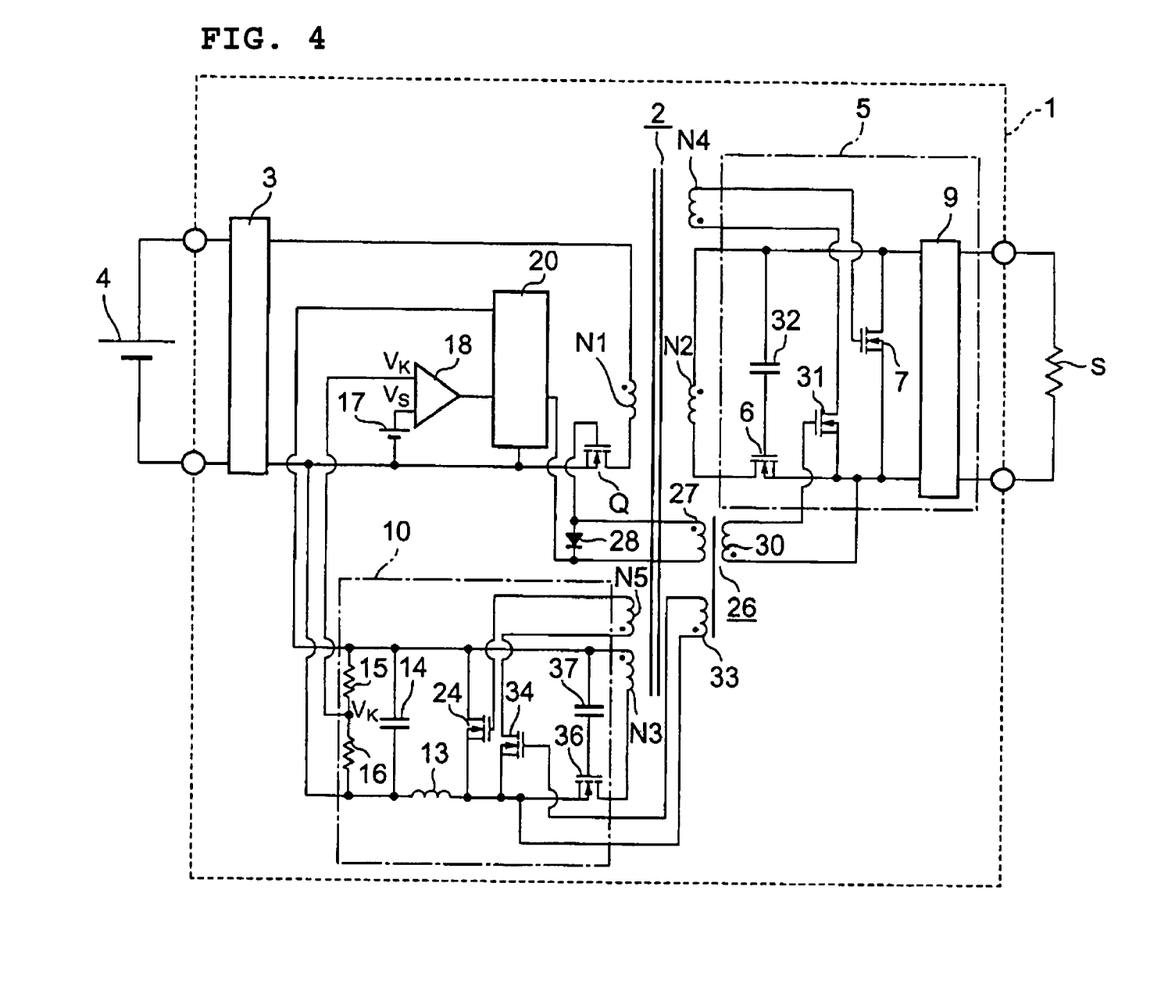
FIG. 4 is a circuit diagram showing main circuit components of an isolated DC-DC converter according to a third preferred embodiment of the present invention.

In the third preferred embodiment, a rectification-side synchronous rectifier (for example, a MOS-FET) 36 is provided as a rectifying device on the rectification side of the tertiary-side rectifying and smoothing circuit 10, as shown in FIG. 4. The gate of the rectification-side synchronous rectifier 36 is connected to the tertiary coil N3 via a capacitor 37. The rectification-side synchronous rectifier 36 is switched on due to a voltage of the tertiary coil N3 during the period in which the main switching device Q is switched on, and the rectification-side synchronous rectifier 36 is switched off during the period in which the main switching device Q is switched off.

Components other than the aforementioned components are the same as those in the second preferred embodiment. In the third preferred embodiment, a synchronous rectifier is used not only as the rectifying device on the commutation side of the tertiary-side rectifying and smoothing circuit 10 but also as the rectifying device on the rectification side of the tertiary-side rectifying and smoothing circuit 10. Thus, a discontinuous current mode can be eliminated from the tertiary-side rectifying and smoothing circuit 10. Thus, a choke coil that has a small inductance can be provided as the choke coil 13, which defines the tertiary-side rectifying and smoothing circuit 10, without consideration of the occurrence of the discontinuous current mode. Accordingly, the cost of the choke coil 13 of the tertiary-side rectifying and smoothing circuit 10 can reduced. Moreover, since the incidence of damage to the choke coil 13 can be reduced, the reliability of the choke coil 13 can be improved.

A fourth preferred embodiment will now be described. In the description of the fourth preferred embodiment, the same reference letters and numerals are assigned to the same components as in the first to third preferred embodiments, and a duplicate description of the common components is omitted.

Figure 5:
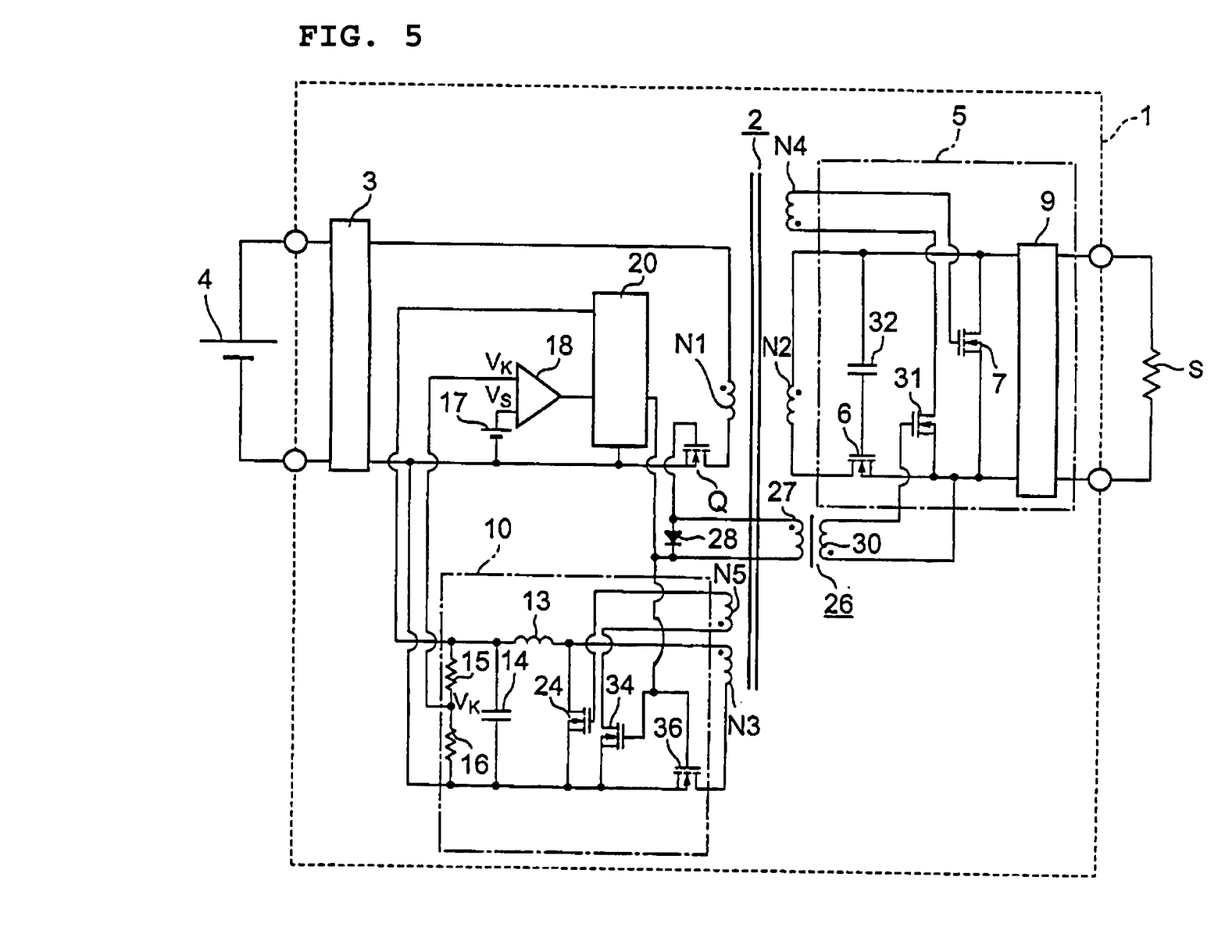
FIG. 5 is a circuit diagram showing main circuit components of an isolated DC-DC converter according to a fourth preferred embodiment of the present invention.

In the fourth preferred embodiment, the choke coil 13 of the tertiary-side rectifying and smoothing circuit 10 is provided between the drain (the positive electrode) of the commutation-side synchronous rectifier 24 and the capacitor 14, as shown in FIG. 5. The circuit configuration can be simplified by using this configuration for the following reason.

That is to say, for example, when the choke coil 13 is provided between the source (the negative electrode) of the commutation-side synchronous rectifier 24 and the capacitor 14, as shown in FIG. 4, the source of the driving switch device 34 and the source of the rectification-side synchronous rectifier 36 are connected to a portion between the tertiary coil N3 and the choke coil 13. Thus, the potentials of the individual sources of the driving switch device 34 and the rectification-side synchronous rectifier 36 depend on a change in the voltage of the tertiary coil N3. In the circuitry shown in FIG. 4, a configuration for controlling the switching operation of the driving switch device 34 and the rectification-side synchronous rectifier 36 is provided with consideration of variation in the potentials of the individual sources of the driving switch device 34 and the rectification-side synchronous rectifier 36. That is to say, the driving transformer 26 includes the tertiary coil 33 for controlling the switching operation of the driving switch device 34, and the tertiary coil 33 is provided in parallel between the gate and source of the driving switch device 34. The switching operation of the driving switch device 34 is controlled by a voltage generated in the tertiary coil 33. The capacitor 37 is provided on a conduction path from the tertiary coil N3 to the gate of the rectification-side synchronous rectifier 36

In contrast, since the choke coil 13 is provided on the side of the positive electrode in the fourth preferred embodiment, as described above, the individual sources of the driving switch device 34 and the rectification-side synchronous rectifier 36 are directly grounded. Thus, the potentials of the individual sources of the driving switch device 34 and the rectification-side synchronous rectifier 36 are stabilized at a ground potential. Accordingly, circuitry for controlling the switching operation of the driving switch device 34 and the rectification-side synchronous rectifier 36 can be provided without consideration of variation in the potentials of the individual sources of the driving switch device 34 and the rectification-side synchronous rectifier 36. That is to say, in the fourth preferred embodiment, the tertiary coil 33 of the aforementioned driving transformer 26 and the capacitor 37 are eliminated. Moreover, the gate of the driving switch device 34 and the gate of the rectification-side synchronous rectifier 36 are connected to an output portion that outputs a switching control signal from the control circuit 20 to the main switching device Q.

In this configuration, the same signal as the switching control signal output from the control circuit 20 to the main switching device Q is applied to the gate of the driving switch device 34 and the gate of the rectification-side synchronous rectifier 36. Thus, the rectification-side synchronous rectifier 36 is switched on when the main switching device Q is switched on, and the rectification-side synchronous rectifier 36 is switched off when the main switching device Q is switched off. In the circuitry of the fourth preferred embodiment, the driving transformer 26 is provided on a conduction path of a signal from the control circuit 20 to the main switching device Q, as in the second and third preferred embodiments. Thus, when the control circuit 20 outputs the turn-on signal (the switching control signal) for switching on the main switching device Q, the main switching device Q is not immediately turned on, and the turn-on of the main switching device Q is delayed. In contrast, the turn-on signal is directly applied to the gate of the driving switch device 34. Thus, the driving switch device 34 is switched on before the main switching device Q is turned on. Accordingly, the commutation-side synchronous rectifier 24 is switched off during the period between the time when the control circuit 20 outputs the turn-on signal and the time when the main switching device Q is turned on.

Components other than the aforementioned components in the fourth preferred embodiment are the same as those in the third preferred embodiment. Since the tertiary coil 33 of the driving transformer 26 and the capacitor 37 can be eliminated in the fourth preferred embodiment, circuitry that is simple compared with that of the third preferred embodiment can be achieved. Moreover, since the parts costs can be reduced, the cost of the isolated DC-DC converter can be reduced.

The present invention is not limited to the first to fourth preferred embodiments, and can be implemented in various preferred embodiments. For example, in the third and fourth preferred embodiments, examples of circuit configurations have been described, in which the commutation-side synchronous rectifier 24 and the rectification-side synchronous rectifier 36 are respectively provided as the commutation-side device and rectification-side device of the tertiary-side rectifying and smoothing circuit 10 in an isolated DC-DC converter that includes the early-turn-off circuit. Alternatively, the commutation-side synchronous rectifier 24 and the rectification-side synchronous rectifier may be respectively provided as the commutation-side device and rectification-side device of the tertiary-side rectifying and smoothing circuit 10 in an isolated DC-DC converter that does not include the early-turn-off circuit.

The isolated DC-DC converters according to the preferred embodiments have excellent stability of the output voltage. Thus, the isolated DC-DC converter can be effectively used in a configuration in which the isolated DC-DC converter is connected to a circuit that requires a stabilized voltage.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. An isolated DC-DC converter comprising:
a transformer including an electromagnetically coupled primary coil, secondary coil, and tertiary coil;
a main switching device arranged on a side of the primary coil of the transformer to control energy supplied from an external power supply to the primary coil by a switching operation to control a voltage generated in the primary coil;
a secondary-side rectifying and smoothing circuit arranged to rectify and smooth an output voltage from the secondary coil corresponding to the voltage of the primary coil of the transformer and output a rectified and smoothed voltage to an external load;
a tertiary-side rectifying and smoothing circuit arranged to rectify and smooth an output voltage from the tertiary coil to produce a direct-current voltage, and detect and output the direct-current voltage as a detected voltage of the output voltage from the secondary-side rectifying and smoothing circuit; and
a control circuit arranged to control the switching operation of the main switching device on the basis of the detected voltage output from the tertiary-side rectifying and smoothing circuit so that the output voltage from the secondary-side rectifying and smoothing circuit is stabilized; wherein
the secondary-side rectifying and smoothing circuit includes a rectification-side synchronous rectifier and a commutation-side synchronous rectifier that perform a switching operation in synchronization with the switching operation of the main switching device to rectify the output voltage from the secondary coil; and
the tertiary-side rectifying and smoothing circuit includes a commutation-side synchronous rectifier to rectify the output voltage from the tertiary coil, the commutation-side synchronous rectifier being arranged to be switched on when the main switching device is turned off.

2. The isolated DC-DC converter according to claim 1, wherein the control circuit is arranged to output a turn-on signal to charge an input capacitance of the main switching device and turn-on the main switching device, the isolated DC-DC converter further comprising an early-turn-off circuit arranged to switch off the commutation-side synchronous rectifier of the secondary-side rectifying and smoothing circuit and the commutation-side synchronous rectifier of the tertiary-side rectifying and smoothing circuit before the main switching device is turned on during a time period between when the control circuit starts to output the turn-on signal and the time when the main switching device is turned on, the input capacitance being charged in the period.

3. The isolated DC-DC converter according to claim 2, wherein the early-turn-off circuit of the commutation-side synchronous rectifier of the secondary-side rectifying and smoothing circuit includes a driving transformer, a first driving switch device, and a path of the first driving switch device; and the early-turn-off circuit of the commutation-side synchronous rectifier of the tertiary-side rectifying and smoothing circuit includes the driving transformer, a second driving switch device, and a path of the second driving switch device.

4. The isolated DC-DC converter according to claim 1, wherein the tertiary-side rectifying and smoothing circuit includes a rectification-side synchronous rectifier arranged to be switched on during a period in which the main switching device is turned on in addition to the commutation-side synchronous rectifier.

5. The isolated DC-DC converter according to claim 2, wherein the tertiary-side rectifying and smoothing circuit includes a rectification-side synchronous rectifier that is switched on during a period in which the main switching device is turned on in addition to the commutation-side synchronous rectifier.

6. The isolated DC-DC converter according to claim 4, wherein a choke coil of the tertiary-side rectifying and smoothing circuit is provided between a positive electrode of the commutation-side synchronous rectifier and a smoothing capacitor of the tertiary-side rectifying and smoothing circuit.

7. The isolated DC-DC converter according to claim 5, wherein a choke coil of the tertiary-side rectifying and smoothing circuit is provided between a positive electrode of the commutation-side synchronous rectifier and a smoothing capacitor of the tertiary-side rectifying and smoothing circuit.

* * * * *